(12) United States Patent
Cobb, Jr.

(10) Patent No.: US 6,273,037 B1
(45) Date of Patent: Aug. 14, 2001

(54) COMPRESSED AIR ASSISTED FUEL INJECTION SYSTEM

(75) Inventor: William T. Cobb, Jr., St. Petersburg, FL (US)

(73) Assignee: Design & Manufacturing Solutions, Inc., Tampa, FL (US)

( * ) Notice: Subject to any disclaimer, the term of this patent is extended or adjusted under 35 U.S.C. 154(b) by 0 days.

(21) Appl. No.: 09/138,244

(22) Filed: Aug. 21, 1998

(51) Int. Cl.$^7$ .................................................. F02B 33/04

(52) U.S. Cl. ................................. 123/73 B; 123/73 PP; 123/65 P

(58) Field of Search ............................. 123/73 B, 73 PP, 123/65 P

(56) References Cited

U.S. PATENT DOCUMENTS

| 1,139,364 | 5/1915 | Obergfell . |
| 1,527,166 | 2/1925 | Bezu . |
| 2,090,149 | 8/1937 | Pollister ............................ 123/65 P |

(List continued on next page.)

FOREIGN PATENT DOCUMENTS

| 681793 | 9/1939 | (DE) . |
| 0302045 | 2/1989 | (EP) . |
| 397695 | 6/1994 | (EP) . |
| 2115485 | 9/1983 | (GB) . |
| 77105061 | 7/1988 | (JP) . |
| WO 96/00843 | 1/1996 | (WO) . |
| WO 97/02424 | 1/1997 | (WO) . |
| WO 97/22852 | 6/1997 | (WO) . |

OTHER PUBLICATIONS

Le Moteur A Deux–Temps, A Injection Electronique, Ingenieurs de L'automobile, Nov. 1977, 26 pages by Jaulmes et al., pp 717–729, and 30 page translation of Ingenieurs de l'Automobile.

Development of A Pumpless Air Assisted Injection System for Two–cycle, S.I. Engines, R. Gentili et al., SAE, 1994, pp. 87–100.

IAPAC Compressed Air Assisted Fuel Injection for High Efficiency Low Emmissions Marine Outboard Two–Stroke Engines, G. Monnier et al., SAE Paper 911849, 1991, pp. 123–135.

Delayed Charging: A Means to Improve Two–Stroke Engine Characteristics, P. Rochelle, SAE Paper 941678, 1994, pp. 1–9.

The OCP Small Engine Fuel Injection System For Future Two–Stroke Marine Engines, S. Leighton et al., SAE Paper 941687, 1994, pp. 115–122.

Diaphragm Injection Carburettor (DIC) for Stratified–Scavenging of Small Two–Stroke Gasoline Engine, X. Yang et al., SAE Paper 960364, 1996, pp. 55–62.

Diaphragm Fuel Injection System (DFI) for Stratified–Scavenging of Small Two–Stoke Gasoline Engine, X. Yang et al., SAE Paper 960365, 1996, pp. 63–71.

(List continued on next page.)

*Primary Examiner*—John Kwon
(74) *Attorney, Agent, or Firm*—Mark F. Harrington

(57) ABSTRACT

An internal combustion engine having a compressed air assisted fuel injection system. The injection system has a compressed air accumulator with a first aperture into the cylinder of the engine and a second aperture into the crankcase of the engine. The two apertures are located at opposite ends of the accumulator and the accumulator has a tube shape. The accumulator blows off pressure every time one of the ports into the cylinder is closed. The tube shape of the accumulator forms a tuned reflection pipe for a compression wave from the cylinder to generate a reflected compression wave for assisting in delivering fuel and air into the cylinder. The two apertures are adapted to be opened and closed by the piston head of the engine.

57 Claims, 7 Drawing Sheets

U.S. PATENT DOCUMENTS

| | | | | |
|---|---|---|---|---|
| 3,263,701 | | 8/1966 | Johnson | 137/533.17 |
| 3,265,050 | | 8/1966 | Tuckey | 123/119 |
| 3,353,525 | | 11/1967 | Nutten et al. | 123/119 |
| 3,441,010 | | 4/1969 | Barr et al. | 123/119 |
| 3,633,557 | | 1/1972 | Tuckey | 123/119 B |
| 3,640,512 | | 2/1972 | Morgenroth | 216/34 A |
| 3,738,623 | | 6/1973 | Tuckey | 261/35 |
| 3,743,254 | | 7/1973 | Tuckey | 261/34 A |
| 3,765,657 | | 10/1973 | Du Bois | 261/37 |
| 3,858,562 | * | 1/1975 | Lanpheer | 123/65 P |
| 3,870,025 | | 3/1975 | Anderson et al. | 123/139 AF |
| 3,933,949 | | 1/1976 | Woody | 261/35 |
| 4,159,012 | | 6/1979 | Pizzuto et al. | 123/65 R |
| 4,210,105 | | 7/1980 | Nohira et al. | 123/277 |
| 4,258,670 | * | 3/1981 | Thery | 123/73 B |
| 4,340,016 | | 7/1982 | Ehrlich | 123/73 R |
| 4,378,762 | | 4/1983 | Ehrlich | 123/73 PP |
| 4,383,503 | | 5/1983 | Griffiths | 123/73 PP |
| 4,455,266 | | 6/1984 | Gerhardy | 261/35 |
| 4,628,881 | | 12/1986 | Beck et al. | 123/447 |
| 4,628,888 | | 12/1986 | Duret | 123/531 |
| 4,693,224 | | 9/1987 | McKay | 123/531 |
| 4,716,877 | | 1/1988 | Duret | 123/531 |
| 4,770,132 | | 9/1988 | Sougawa | 123/73 A |
| 4,781,164 | | 11/1988 | Seeber et al. | 123/533 |
| 4,794,902 | | 1/1989 | McKay | 123/533 |
| 4,813,391 | | 3/1989 | Geyer et al. | 123/73 C |
| 4,846,119 | | 7/1989 | Geyer et al. | 123/73 C |
| 4,917,073 | | 4/1990 | Duret | 123/73 C |
| 4,944,255 | | 7/1990 | Duret | 123/65 EM |
| 4,995,349 | | 2/1991 | Tuckey | 123/65 VB |
| 5,027,759 | | 7/1991 | Luo | 123/73 PP |
| 5,027,765 | | 7/1991 | Duret | 123/316 |
| 5,060,602 | | 10/1991 | Maissant | 123/47 A |
| 5,105,775 | | 4/1992 | Maissant | 123/70 R |
| 5,197,417 | | 3/1993 | Tuckermann et al. | 123/73 C |
| 5,197,418 | | 3/1993 | Wissmann et al. | 123/73 C |
| 5,203,310 | | 4/1993 | Gatellier | 123/568 |
| 5,215,064 | | 6/1993 | Monnier et al. | 123/532 |
| 5,273,004 | | 12/1993 | Duret et al. | 123/73 V |
| 5,284,111 | | 2/1994 | Geyer et al. | 123/73 C |
| 5,285,753 | | 2/1994 | Duret et al. | 123/65 V |
| 5,351,668 | | 10/1994 | Gatallier | 123/568 |
| 5,353,754 | | 10/1994 | Wissmann et al. | 123/73 C |
| 5,365,893 | | 11/1994 | Wissmann et al. | 123/73 C |
| 5,375,573 | | 12/1994 | Bowman | 123/196 R |
| 5,377,637 | | 1/1995 | Leighton et al. | 123/73 AD |
| 5,377,650 | | 1/1995 | Warner | 123/568 |
| 5,392,828 | | 2/1995 | Watson et al. | 141/330 |
| 5,419,289 | | 5/1995 | Duret et al. | 123/73 B |
| 5,438,968 | | 8/1995 | Johnson et al. | 123/446 |
| 5,441,030 | | 8/1995 | Satsukawa | 123/491 |
| 5,443,045 | | 8/1995 | Marconi | 123/299 |
| 5,477,822 | | 12/1995 | Haghgooie et al. | 123/286 |
| 5,477,833 | | 12/1995 | Leighton | 123/497 |
| 5,483,943 | | 1/1996 | Peters | 123/527 |
| 5,483,944 | | 1/1996 | Leighton | 123/531 |
| 5,503,119 | * | 4/1996 | Glover | 123/73 B |
| 5,546,902 | | 8/1996 | Paluch et al. | 123/304 |
| 5,551,638 | | 9/1996 | Caley | 239/453 |
| 5,558,070 | | 9/1996 | Bell et al. | 123/568 |
| 5,579,735 | | 12/1996 | Todero et al. | 123/317 |
| 5,588,408 | | 12/1996 | Kurihara | 123/196 W |
| 5,609,137 | | 3/1997 | Rembold et al. | 123/382 |
| 5,622,155 | | 4/1997 | Ellwood et al. | 123/531 |
| 5,628,295 | | 5/1997 | Todero et al. | 123/568 |
| 5,645,026 | | 7/1997 | Schlessmann | 123/184.46 |
| 5,685,273 | | 11/1997 | Johnson et al. | 123/446 |
| 6,079,379 | * | 6/2000 | Cobb, Jr. | 123/73 B |

OTHER PUBLICATIONS

Improving The Exhaust Emissions of Two–Stroke Engines by Applying the Activated Radical Combustion, Y. Ishibashi et al., SAE Paper 960742, 1996, pp. 113–123.

Pro–Ject Air–Assisted Fuel Injection System for Two–Stoke S.I. Engines, R. Gentili et al., SAE Paper 960360, pp. 1–6.

Application of Direct Air–Assisted Fuel Injection to a SI Cross–Scavenged Two–Stroke Engine, R. G. Kenny, et al., SAE Paper 932396, 1993, pp. 37–50.

"The Orbital Combustion Procss for Future Small Two–Stroke Engines", S. Leighton et al., *A New Generation of Two–Stroke Engines for the Future?*, 1993, pp. 195–206.

New Developments for Clean Marine Outboard Two–Stroke Engines, P. Duret, *A New Generation of Two–Stroke Engines for the Future?*, 1993, pp. 125–145.

A Trial For Stabilizing Combustion in Two–Stroke Engines at Part Throttle Operation, Y. Ishibashi et al., *A New Generation of Two–Stroke Engines for the Future?*, 1993, pp. 113–124.

"IAPAC Two–Stroke Engine for High Efficiency Low Emissions Scooters", G. Monner et al., *A New Generation of Two–Stroke Engines for the Future?*, 1993, pp. 101–111.

"The IAPAC Fluid Dynamically Controlled Automotive Two–Stroke Combustion Process", P. Duret et al., *A New Generation of Two–Stroke Engines for the Future?*, 1993, pp. 77–98.

SAE Techincal Paper Series, "Development of a Fuel Injected Two–Stroke Gasoline Engine", D. Plohberger et al., Paper No. 880170, 1988, 17 pages.

"Recent Research Activities on Small Diesel and Gasoline Engines", K. Landfahrer, C372/018, 5 pages.

Advertisement, "AVL SDIS, Semi Direct Injection System", AVL List Gmbh, 1 page.

SCIP: A New Simplified Camless IAPAC Direct Injection for Low Emission Small Two–Stroke Engines, J. Dabadie, SAE Paper, 10 pages.

"Emission and Fuel Consumption Reduction in a Two–Stroke Engine Using Delayed–Charging" by Rochelle, SAE Paper 951784, 1995, pp. 217–226.

RedMax Scores With Air head Engine, Power Equipment Trade, Jul. 1998, p. 74.

"Tanaka Meets CARB Tier II With New PureFire Engine" By Ken Morrision, Power Equipment Trade, Jul. 1998, pp. 16–22 and 116.

* cited by examiner

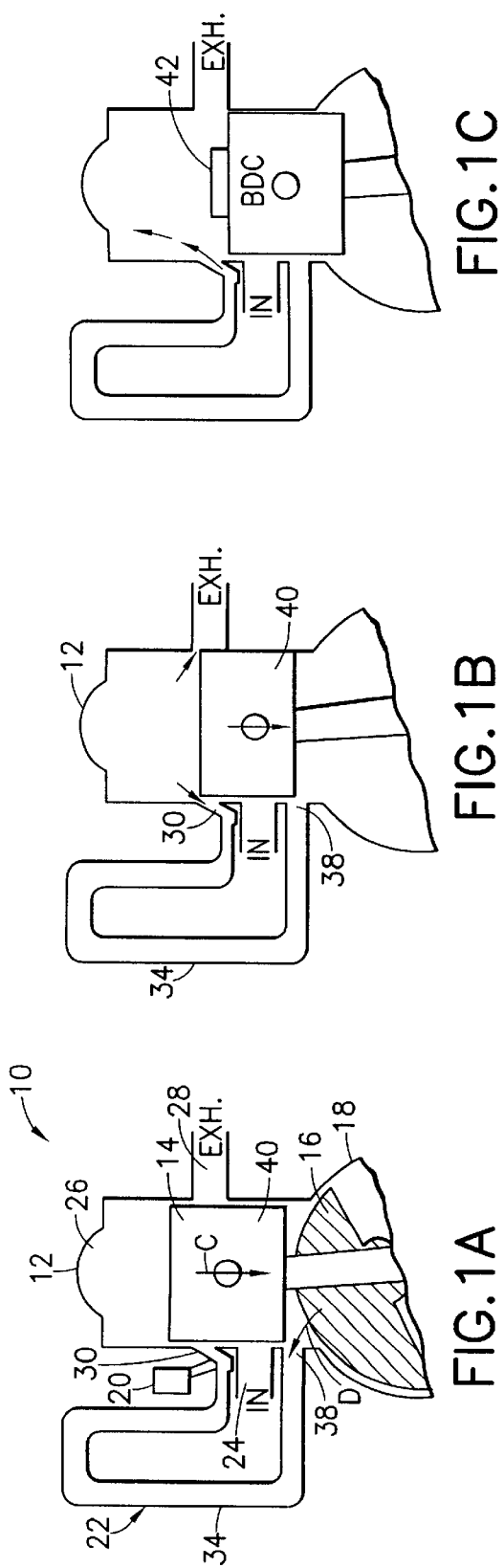
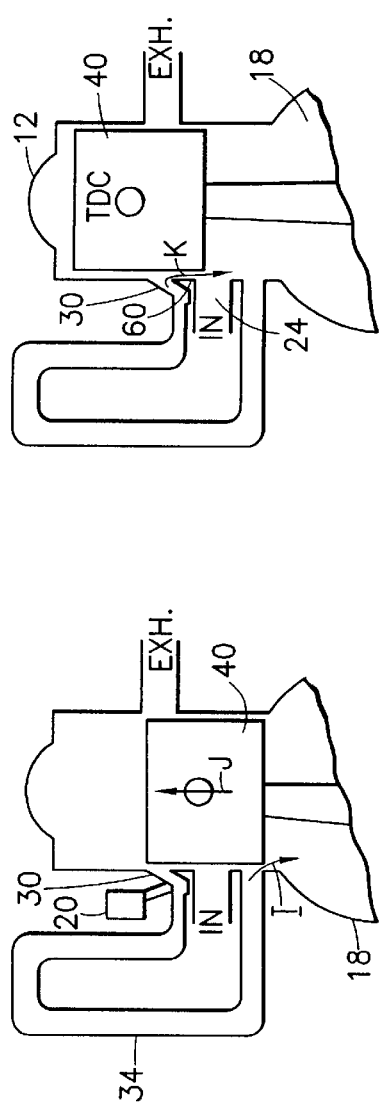

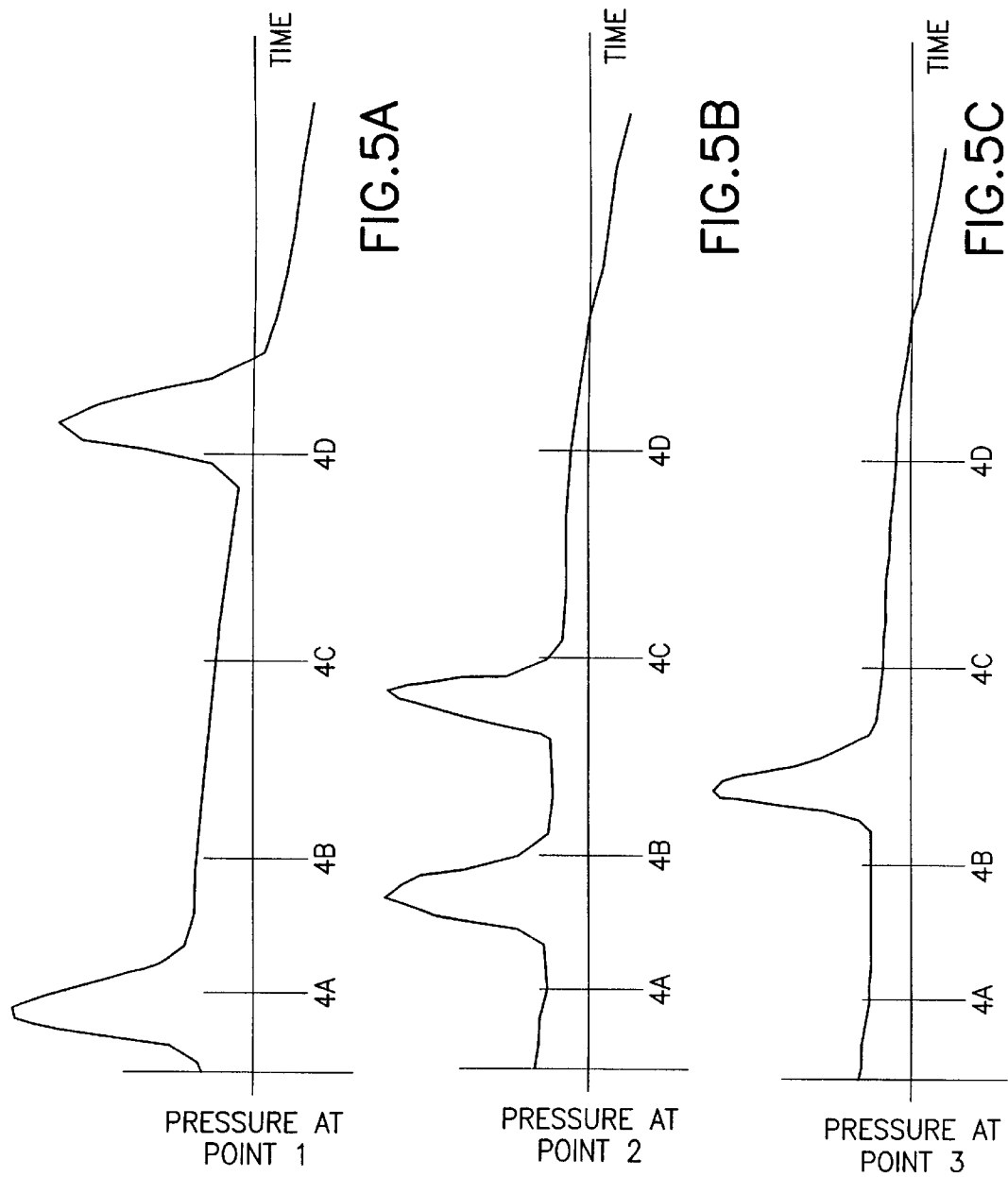

COMPRESSED AIR ASSISTED FUEL INJECTION SYSTEM

BACKGROUND OF THE INVENTION

1. Field of the Invention

The present invention relates to fuel injection systems for internal combustion engines and, more specifically, to a control system for a two-stroke engine.

2. Prior Art

Several alternatives for the pressurized air utilized in the injection are known; a separate air pump may be utilized, the air source may be derived from the cylinder of the engine during the compression or the expansion stroke, or the air may be derived from the crankcase pumping of the engine. In low cost applications it is desired to utilize the air source from the crankcase or the cylinder, so as to avoid the added cost and complexity of the separate air pump. In the application of pneumatic injection to larger cylinder sized engines, in general larger than 50 cc displacement, it is generally desirable to utilize injection pressure derived from the cylinder pressure because a high gas pressure may be obtained for injection. In smaller engines this tapping utilizes a disproportionate quantity of the cylinder charge gases and, thus, adversely affects the performance of the engine. It is therefore more practical to utilize the crankcase pumping source in such cases.

It is most beneficial to inject the fuel into the cylinder near to or slightly after the bottom dead center position of the piston. This injection timing avoids introducing the fuel into the early phase of the cylinder scavenging, and thus avoiding short circuit loss to the exhaust. Further, the fuel is introduced into the cylinder when the pressure in the cylinder in near atmospheric pressure, allowing the best use of the limited injection pressure to spray and therefore atomize the fuel charge. Thus, it is desirable to have a pneumatic injection timing near to the bottom dead center timing of the piston and that this timing be relatively constant with changing engine operational parameters such as speed and throttle position or load.

Several methods for operating an injection valve are taught in the prior art. U.S. Pat. No. 4,693,224 teaches the use of an electronic solenoid to operate the injection valve. This is generally unacceptable for application to small high speed engines because of the necessity of an engine control unit to operate the valve and the relatively high power requirement to drive the high speed solenoid, both adding prohibitive costs to the engine. The most common method of operating the valve as taught by the prior art is the use of some form of kinematic valve linkage driven from the crank shaft of the engine. These valves take the form of oscillating valves driven by cams as taught by a system called "PRO-JECT" described in an article "Pro-Ject Air-Assisted Fuel Injection System For Two-Stroke Engines", SAE 940397 from Universita di Pisa and a system from L'Institut Francais du Petrole described in an article "A New Two-Stroke Engine With Compressed Air Assisted Fuel Injection For High Efficiency Low Emissions Applications" by Duret et al. in SAE 880176, or rotating type valves as taught by Honda in an article "An Experimental Study of Stratified Scavenging Activated Radical Combustion Engine" by Ishibashi, SAE 972077. A problem exists with all the forms of kinematically driven valves in that they need precision surfaces and high quality materials for both the sealing members of the valve and the running portions of the drive. Valves mounted such that they are exposed to combustion gases must also be fashioned from expensive heat resistant materials. Additionally, many parts require lubrication which is not presently available in the simple two-stroke engine. Thus, the mechanical type valve arrangements add significant costs and complexity to the construction of the engine. Therefore, it is desirable to fashion an injection control valve that may be made of inexpensive materials and need not be manufactured to high tolerance, the valve and drive mechanism most preferably would require no high temperature capability or additional lubrication.

Further, an additional problem is commonly known to exist in the application of oscillating valves to high speed engines. The problem is that of the greatly increasing drive force required as the engine speed increases. For a fixed valve opening amplitude or lift, the acceleration required of the valve increases in proportion to the square of the valve opening frequency and therefore the engine speed. Further, the force required to drive the valve increases in proportion to the acceleration. Thus, the force required to drive the valve increases in proportion to the square of the engine speed. For single acting valve trains, that is valves actively driven in only one direction, these high drive forces lead to the use of large return springs to over come the valve inertial forces and prevent valve float, and consequently even more elevated drive forces. It is desirable to drive the valve in both directions, both open and closed, to avoid the use of large spring members and the associated high forces, while still attaining high speed operation. Mechanical means can be applied to drive the valve in both directions, however, this requires an even higher degree of precision and leads to even greater cost and complexity of the engine.

The final method of driving the injection valve is to operate the valve pneumatically. Pneumatic operation is affected by driving a piston through the use of a differential gas pressure across the two opposing faces of the piston. This piston in turn drives the valve. The use of pneumatic operation is common practice in gas flow control, in such devices as flow regulators and flow control valves such as spool valves. In engine operation pneumatically controlled valves are commonly utilized in carburetor operation for flow control, regulation of pressures and various operations such as driving liquid injections and opening addition flow paths. Examples of such use are shown in U.S. Pat. Nos. 5,377,637; 5,353,754; 5,197,417; 5,197,418; 4,846,119 and 4,813,391. In their application to engines where limited motion is required the piston is often in the form of a diaphragm, acting as the piston seal, and diaphragm plates functioning as the drive piston.

The use of pneumatic valve operation for control of a pneumatic injection system is taught in WO 96/07817 and EP 0789138A1. These systems utilize an injection valve placed in the head of the combustion chamber and operated on by pressures derived from various locations of the engine to influence the valve motion.

IAPAC direct fuel injection systems which use a cam to control introduction of scavenged compressed air from a crankcase have been used in the past to reduce pollutant emissions and fuel consumption in two-stroke engines. European Patent Office patent publication No. EP 0789138 discloses a camless IAPAC system (now known as SCIP) which uses a diaphragm connected to a valve, a spring, pressure from the engine crankcase, and pressure from combustion expansion gases in the combustion chamber to delay movement of the valve.

A problem exists with the cam driven IAPAC system in that added components increase cost to the engine. A problem exists with the SCIP system in that misfires in the combustion chamber result in no combustion expansion gases to delay movement of the valve. Misfires in a two-stroke engine can happen as often as one out of every three piston cycles. Thus, injection of fuel and air into the combustion chamber using a SCIP system can result in a substantial number of premature injections; about one-third of the time.

WO 96/07817 teaches a pneumatic valve that is opened when the injection pressure as derived from the crankcase of the engine overcomes the pressure from the valve closing spring and a delayed pressure wave derived from the crankcase. A problem exists in such a system that the injection pressure as derived from the crankcase is highly dependent on the engine operating condition. The peak pressure attained by the crankcase in a small two stroke engine varies with the throttle position. At wide open throttle (WOT) the peak pressure may reach 6 to 7 pounds per square inch above atmospheric pressure (psig), while at low throttle opening the peak pressure only reaches 1.5 to 2 psig. Thus the injection pressure available to open the valve is highly dependent on operating condition and thus, the injection timing is dependent on operating conditions. Further, in a small high speed engine the area of the valve is severely limited by the available space in the engine. This small area and the relatively low injection pressure available to act on that area lead to a small available force for valve opening. This coupled with the previously mention phenomenon of the required high force at high speed severely limit the use in the small high speed application. Thus it is desirable to have a valve actuation system that is largely independent of injection pressure, further it is desired that the primary motive force be derived from the diaphragm or drive piston such that the valve operation is largely independent of valve area.

A further problem exists with WO 96/07817. The wave used to control the injection is derived from the crankcase pressure through a long 'delay' line. The delay line is used to control the time of arrival of the pressure wave at the valve. The Transit time in seconds of the pressure wave is fairly constant, however the transit and arrival timing in terms of crankshaft position, and therefore piston position, is highly dependent on engine speed. Thus, the injection timing is highly dependent on engine speed. Further the delay line also acts to attenuate the pressure wave, this attenuation is more acute with increasing engine speed. The attenuation coupled with the relatively weak crankcase wave render an inadequate control pressure in high speed/high load operation. It is desired to fashion a valve control system that is largely independent of engine speed.

Other embodiments of the art teach the use of controlling crank 'cheeks' and additional delay lines to further control the pressure waves. These controlling cheeks must be made as precision valve surfaces to control the small flows associated with the valve control and thus add significant cost to the engine. The additional delay lines impart further speed dependence on the injection timing.

These deficiencies in WO 96/07817 are also pointed out in EP 0789138A1. EP 0789139A1 teaches the use of a valve as in the previous patent where the wave utilized to delay the injection is derived from the cylinder expansion gases. The expansion wave is again delivered to the valve control diaphragm through a delay line. In some embodiments the opening force available is enhanced by the use of longer delay lines from either the cylinder expansion gases or the crankcase wave and is delivered to the opposite side of the actuating diaphragm. Although this embodiment does enhance the opening force and improve on the problem of low pressure of the crankcase wave, the deficiency of the injection timing being highly dependent on engine speed is further introduced. Thus the injection behavior may only be optimized for a specific engine speed.

A further and critical problem is introduced through the use of the expansion gases to control the valve motion. Small two-stroke engines mostly exhibit poor combustion characteristics with misfire or partial combustion occurring every couple of strokes. During misfire there are no combustion expansion gases to be utilized to delay the injection. Further, due to ring seal leakage, the pressure during the normal expansion stroke after misfire is often sub-atmospheric, thus further advancing the injection timing. Therefore, as often as every third stroke the injection occurs at, or before, the beginning of the fresh air scavenging of the cylinder, thereby short circuiting both the unburned charge from the misfired stroke and a large portion of the early injected charge for the following stroke. It is therefore desirable to fashion an injection control system that is largely independent of combustion expansion gases from combustion of an individual piston cycle.

In both of the aforementioned publications the primary motive force for the closure of the valve is a spring positioned in the diaphragm chamber. This spring must be of sufficiently low force to allow the valve to be opened by the low injection pressures or diaphragm drive forces available. This low force combined with the increasing inertial forces of the valve at high speed lead to later and later valve closure and eventually valve float. Again it is desirable to fashion a double acting valve drive system that drives the valve both open and closed in a positive way.

A normal feature of small two-stroke engines is the lack of a separate lubrication system. The lubricant is commonly delivered to the crankcase components and the piston-cylinder unit through being mixed with the fuel. In direct injected engines, including pneumatically injected engine, of the prior art the fuel with no lubricant is delivered to the combustion chamber. This requires the addition of a separate lubrication supply pump and system for the crankcase and piston-cylinder unit, thus adding cost and complexity to the engine. It is therefore desirable to have the injection system supply a limited but significant quantity of fuel oil mixture to the crankcase to meet the engine lubrication requirement with limited additional complexity or cost.

SAE Paper 941678 entitled "Delayed Charging: A Means to Improve Two-Stoke Engine Characteristics" by Rochelle and SAE Paper 951784 entitled "Emission and Fuel Consumption Reduction in a Two-stroke Engine Using Delayed-Charging" by Rochelle, disclose use of an attempted constant flow pressure, by use of a surge tank, but this promotes leaking of fuel between the piston and the cylinder that can increase hydrocardon emissions. Rochelle also has a physically open path between the crankcase and the combustion chamber throught the surge tank at one point which the present invention avoids. Rochelle also neglects acoustic effects.

SUMMARY OF THE INVENTION

In accordance with one embodiment of the present invention, an internal combustion engine is provided having a crankcase, a cylinder connected to the crankcase, and a compressed air assisted fuel injection system connected between the crankcase and the cylinder. A reciprocating piston head is located in the cylinder. The compressed air assisted fuel injection system has a conduit system with a first aperture into the cylinder forming a fuel and compressed air injection port and a second aperture into the crankcase forming a compressed air entrance and blow off port. The piston head opens and closes the two ports as the piston head reciprocates in the cylinder. The first and second apertures are spaced relative to each other and the piston is sized and shaped such that the piston head substantially simultaneously opens the compressed air entrance and blow off port and closes the fuel and compressed air injection port and wherein the blow off port remains open as the piston head moves to and through the top dead center position.

In accordance with another embodiment of the present invention an internal combustion engine is provided having a compressed air assisted fuel injection system connected between a source of compressed air and a cylinder of the engine. The injection system has a compressed air accumulator and means for relieving compressed air pressure in the accumulator during a majority of when a fuel and compressed air injection port of the injection system is closed by a piston head of the engine and the piston head is moving towards a top dead center position.

In accordance with another embodiment of the present invention, an internal combustion engine is provided having a compressed air assisted fuel injection system connected between a source of compressed air and a cylinder of the engine. The injection system includes an accumulator for providing a charge of compressed air and an aperture from the accumulator into the cylinder. The aperture is sized to restrict flow of the charge into the cylinder such that the entire charge is pressurized during an entire fuel and compressed air injection period of the engine.

In accordance with another embodiment of the present invention, an internal combustion engine is provided having a compressed air assisted fuel injection system connected between a source of compressed air and a cylinder of the engine. The injection system has a conduit between the source of compressed air and the cylinder. The conduit has a first aperture into the cylinder and a second aperture. The engine has means for opening and closing the first and second apertures. The second aperture is closed while the first aperture is open and the second aperture open during a majority of when the first aperture is closed.

In accordance with another embodiment of the present invention, an internal combustion engine is provided having a compressed air assisted fuel injection system connected between a crankcase and a cylinder of the engine. The injection system has a conduit between the crankcase and the cylinder. The injection system also has a fuel metering device with a fuel exit into the conduit. A piston head of the engine opens and closed access to the conduit from the cylinder and the crankcase. Access between the cylinder and the conduit is closed and access between the crankcase and the conduit is open during vacuum pressure in the crankcase such that fuel is vacuum pulled into the conduit during a forward stroke of the piston head and air is compressed into the conduit during a rearward stroke of the piston head.

In accordance with another embodiment of the present invention, an internal combustion engine is provided having a compressed air assisted fuel injection system connected between a source of compressed air and a cylinder of the engine. The injection system has an accumulator conduit with an injection port into the cylinder. The accumulator conduit has a length and shape to form a tuned reflection pipe to reflect a compression wave, which enters the injection port from opening of the injection port after combustion in the cylinder, and to deliver the reflected compression wave to the injection port at a predetermined period to assist in delivering fuel out of the injection port and into the cylinder.

In accordance with another embodiment of the present invention, an internal combustion engine compressed air assisted fuel injection system is provided having an accumulator conduit with two apertures located at a cylinder and a crankcase of the engine, respectively, the accumulator conduit has a predetermined length and the apertures are selectively closable such that a compression wave from combustion in the cylinder entering the conduit at a first one of the apertures travels through the conduit and is reflected back to the first aperture wherein the conduit forms a tuned reflection pipe for the first aperture such that the reflected compression wave assists in delivering fuel out of the first aperture into the cylinder.

In accordance with one method of the present invention, a method of injecting air and fuel into a cylinder of an internal combustion engine is provided comprising steps of compressing air into an accumulator; opening an injection port into the cylinder and injecting the compressed air from the accumulator and fuel from the injection port into the cylinder; closing the injection port; and opening a blow off port of the accumulator to relieve residual compressed air pressure from the accumulator.

In accordance with another method of the present invention, a method of manufacturing an internal combustion engine is provided comprising steps of providing a cylinder with an injection port; and connecting a compressed air assisted fuel injection system to the cylinder. The injection system has a fuel metering device and a compressed air accumulator. The compressed air accumulator is provided with a length and shape to reflect a compression wave received at the injection port back to the injection port after a piston head of the engine moves past a bottom dead center position.

In accordance with another method of the present invention, a method of delivering air from a compressed air assisted fuel injection system into a cylinder of an internal combustion engine is provided comprising steps of compressing air into an accumulator of the injection system; releasing a first amount of compressed air out the accumulator and through an injection port into the cylinder at a first pressure; and releasing a subsequent second amount of compressed air out the accumulator and through the injection port into the cylinder at a second pressure higher than the first pressure.

In accordance with another method of the present invention, a method of delivering fuel and air from a compressed air assisted fuel injection system into a cylinder of an internal combustion engine is provided comprising steps of providing the injection system with a compressed air accumulator having a channel between a crankcase of the engine and the cylinder; delivering a first amount of fuel and compressed air from the channel into the cylinder; and delivering a subsequent second amount of fuel and compressed air at a higher rate from the channel into the cylinder, wherein the step of delivering the first and second amounts occur in a single injection cycle.

BRIEF DESCRIPTION OF THE DRAWINGS

The foregoing aspects and other features of the present invention are explained in the following description, taken in connection with the accompanying drawings, wherein:

FIGS. 1A–1E are partial schematic diagrams of an engine incorporating features of the present invention with the piston head at various different operational positions;

FIGS. 5A–5C are pressure diagrams of for three points along the length of the accumulator conduit;

DETAILED DESCRIPTION OF THE PREFERRED EMBODIMENT

Figure 2:
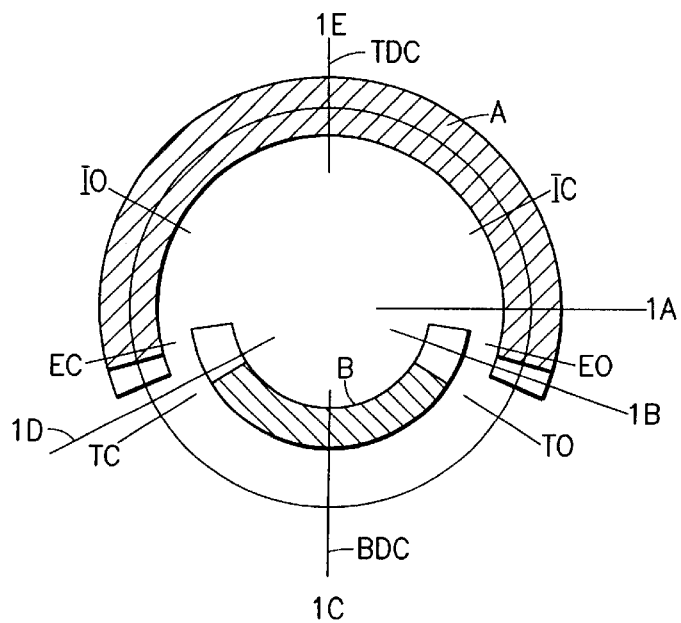
FIG. 2 is a diagram illustrating open and closed positions of the two apertures of the accumulator based upon crankcase rotation and resulting piston head positioning.

Referring to FIG. 1A, there is shown a schematic view of an internal combustion engine 10 incorporating features of the present invention. Although the present invention will be described with reference to the embodiments shown in the drawings, it should be understood that the present invention can be embodied in many alternate forms of embodiments. In addition, any suitable size, shape or type of elements or materials could be used.

The engine 10 is a two-stroke engine having a cylinder 12, a piston 14, a crankshaft 16, a crankcase 18, and a fuel injection system 22 having a fuel metering system 20. The present invention relates to the control of a low pressure injection in an internal combustion engine. A particular field of application of the invention is a two-stroke internal combustion engine. The specific application described is to a small high speed two-stroke engine, such as utilized in handheld power equipment such as leaf blowers, string trimmers and hedge trimmers, also in wheeled vehicle applications such as mopeds, motorcycles and scooters and in small outboard boat engines. The small two-stroke engine has many desirable characteristics, that lend themselves to the above applications, including: simplicity of construction, low cost of manufacturing, high power-to-weight ratios, high speed operational capability and, in many parts of the world, ease of maintenance with simple facilities.

The prominent drawback of the simple two-stroke engine is the loss of a portion of the fresh unburned fuel charge from the cylinder during the scavenging process. This leads to poor fuel economy and, most importantly, high emission of unburned hydrocarbon, thus rendering the simple two-stroke engine incapable of compliance with increasingly stringent governmental pollution restrictions. This drawback can be relieved by separating the scavenging of the cylinder, with fresh air, from the charging of the cylinder, with fuel. This separation can be achieved by injecting the liquid fuel into the cylinder or more preferably by injecting the fuel charge by utilizing a pressurized air source, separate from the fresh air scavenge, to spray the fuel into the cylinder. In a preferred embodiment of the present invention, the displacement size of the engine is about 16 cc to about 100 cc, but could be larger or smaller. These sizes of engines are used for such things as string trimmers, chain saws, leaf blowers, and other hand held power tools. The engine could also be used on a tool such as a lawn mower, snow blower or motor boat outboard engine. The cylinder 12 has a spark plug (not shown) connected to its top, a bottom which is connected to the crankcase 18, an air inlet 24, a combustion chamber 26, an exhaust outlet 28, and an injection port or inlet 30 into the combustion chamber. The fuel metering system 20 could be any suitable type of system, such as a carburetor or electronic fuel injector. However, an advantage of the present system is that there is no need for high precision timing or spray quality for the fuel metering system. A relatively simple metering system that delivers drops of fuel could be used. In the embodiment shown in FIG. 1A the injection port 30 is an open type of port; i.e.: with no flow check valve into the combustion chamber 26. However, an alternate embodiment could be provided which has a flow check valve at its injection port, such as disclosed in U.S. patent application Ser. No. 09/065,374 which is hereby incorporated by reference in its entirety. However, any suitable check valve could be used. The injection port 30 is located in a side wall of the cylinder 12 and is shaped to input fuel and air in an upward direction towards the top of the cylinder head. However, in alternate embodiments the inlet could be located in the top of the cylinder head or be shaped to direct fuel towards the top of the piston 14.

The fuel injection system 22 is a compressed air assisted system. The injection system 22 comprises an accumulator 34. The accumulator 34, in this embodiment, has an inlet 38 connectable to pressure inside the crankcase 18 and an exit at the injection port 30. The accumulator 34 functions as a collector and temporary storage area for compressed air. In this embodiment the source of the compressed air is air scavenged from the crankcase 18. The piston 14 compresses the air in the crankcase 18 on the piston's downward stroke. In a preferred embodiment the two apertures 30, 38 are both provided in the cylinder 12; one above the air inlet 24 and one below the air inlet. In the preferred embodiment both apertures 30, 38 are piston ported. In other words, the piston. head 40 is sized and shaped to open and close access through the apertures 30, 38 as the piston head 40 reciprocates up and down in the cylinder 12. The accumulator 34, in this embodiment, is a simple channel between the two apertures 30, 38. However, in alternate embodiments more complicated shapes could be provided as further understood from the description below. The channel 34 could be partially machined into an exterior surface of the cylinder 12 with a cap then being attached to the cylinder to form and enclose the channel 34 with only the two apertures 30, 38. However, the accumulator could be provided in a separate member attached to the cylinder 12. In the preferred embodiment an exit from the fuel metering system 20 is located in the channel 34 proximate the injection port 30.

Figure 3:
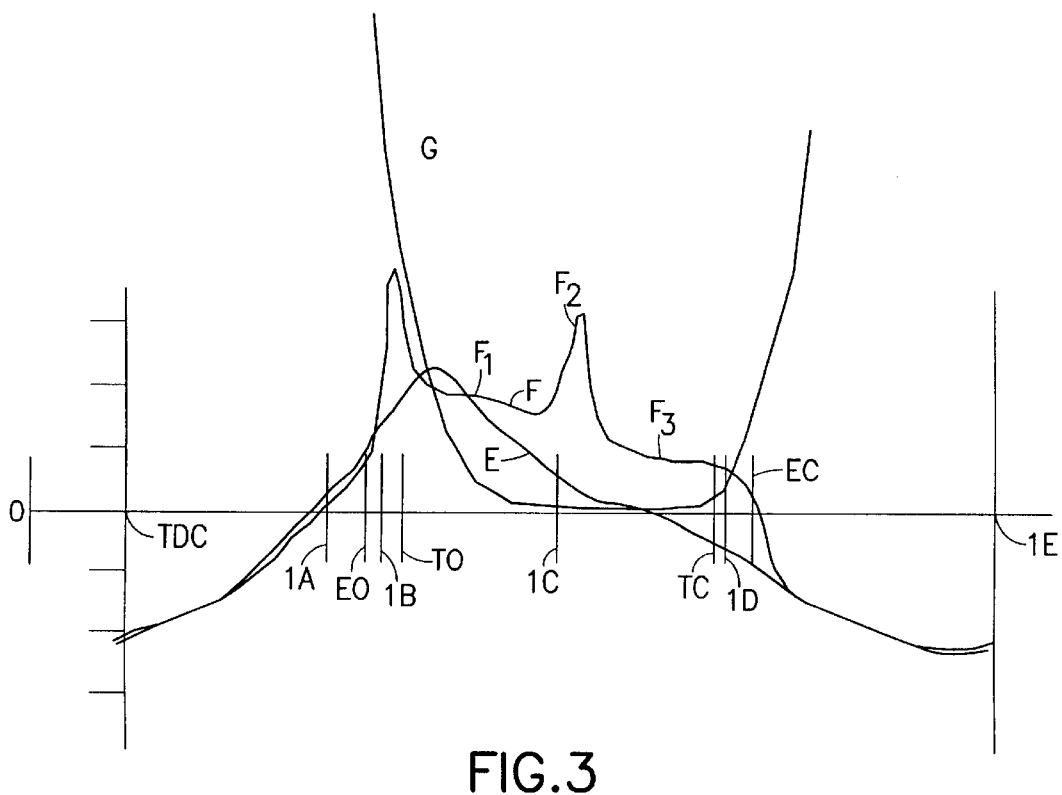
FIG. 3 is a graph of pressures in the crankcase, combustion chamber and accumulator relative to piston head positioning in the cylinder.

As will be further described below, the fuel injection system 22 has minimal moving parts; merely whatever moving parts are in the fuel metering device 20. Otherwise, the fuel injection system 22 uses the piston head 40 to open and close its ports 30, 38. Timing of the opening and closing of the ports 30, 38 will be dependent upon location of the ports along the length of the cylinder 12. Referring to FIGS. 1A–1E and 2 the operation of the injection system will now be described. FIG. 2 is intended to illustrate a line of events of opening and closing of the apertures 30, 38 during a single full piston cycle (which results from a 360° rotation of the crankshaft 16) as a 360° chart corresponding to piston head location as based upon angular position of the crankshaft 16 starting at the top dead center (TDC) position of the piston 14. Area A indicates when the piston head 40 blocks the aperture 30. Area B indicates when the piston head 40 blocks the aperture 38. At TDC the inlet 30 is blocked by the side of the piston head 40. At TDC the aperture 38 is open. The air inlet 24 is closed by the piston head at position IC which is about 60° after top dead center (ATDC). FIG. 1A shows the piston head 40 at about 90° ATDC as indicated by position 1A in FIG. 2 moving downward in the cylinder 12 as shown by arrow C away from the top dead center position of the piston head. The piston head 40 is blocking the inlet 30, the exhaust outlet 28 and the air inlet 24, but the aperture 38 is open. With the piston head 40 moving towards the crankcase 18, air from inside the crankcase 18 is pushed into the accumulator 34 through the aperture 38 as indicated by arrow D. Referring also to FIG. 3, a graph of pressures during a single piston cycle are shown relative to zero gage, pressure of one atmosphere. At TDC the pressure E in the crankcase 18 and the pressure F in the accumulator 34 at the inlet 30 are substantially the same. They remain substantially the same as the piston head moves through position 1A. As the piston head 40 continues to move down in the cylinder 12 the exhaust outlet 28 is opened at E0. Pressure G in the combustion chamber 26, caused by expanding gases from combustion, starts to drop.

As the piston head 40 moves towards position 1B, illustrated in FIG. 1B, the aperture 30 is beginning to be opened, as the piston head 40 uncovers the aperture 30, and the aperture 38 is beginning to be closed, as the piston head 40 starts to block the aperture 38. The piston head uncovers the inlet 30 at about 100° of rotation of the crankshaft after TDC (ATDC). In this embodiment the piston head 40 completely closes the aperture 38 at about the same time the piston head opens access to the transfer channel 42 (see FIG. 1C) at position TO when the transfer 42 opens.

Figure 4B:
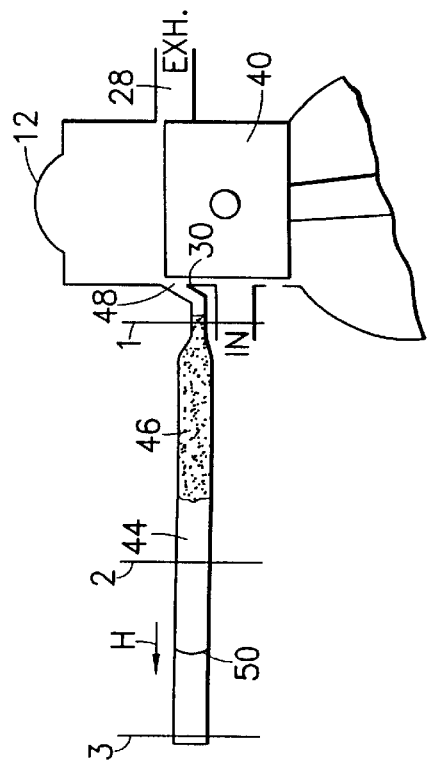
FIG. 4A–4D are schematic diagrams similar to FIG. 1A for piston locations between 1B and 1C of FIG. 2 and showing compression wave and reflected compression wave movement.
Figure 4D:
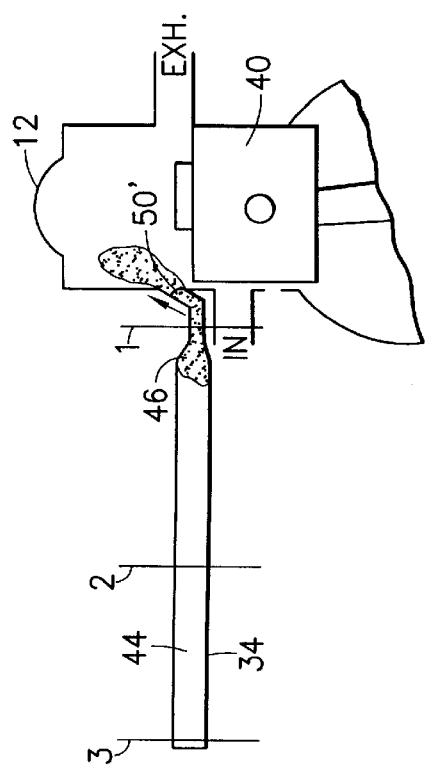
Figure 4A:
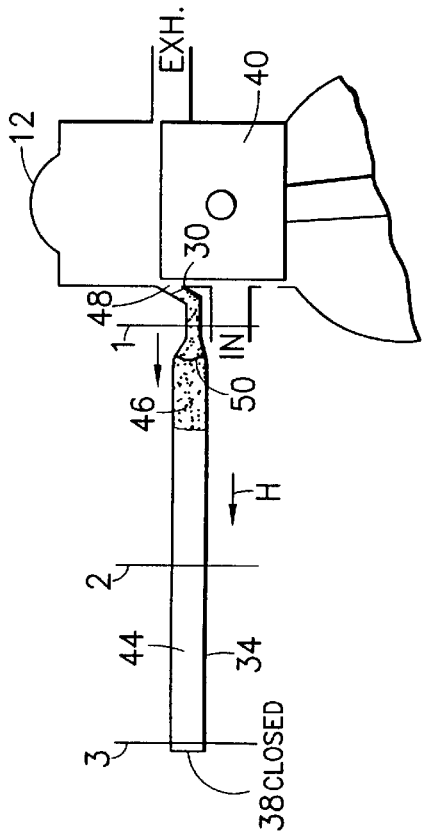

Referring also to FIGS. 4A–4D pressures and movement of gases in the accumulator 34 during the period between 1B and 1C will be further described. FIGS. 4A–4D schematically illustrate the accumulator 34 as a closed end pipe. This is because the aperture 38 is effectively closed by the piston head 40 substantially entirely while the aperture 30 is open. FIG. 4A generally corresponds to position 1B. In this position the accumulator 34 has a volume 44 of compressed air, a volume 46 of compressed air and fuel, and the beginning of a slight buffer 48 of combustion gases. In addition, a compression wave 50 enters the accumulator 34 from the aperture 30 and travels down the accumulator at the speed of sound as illustrated by arrow H towards the now closed aperture $38_{closed}$. Pressure F at the inlet 30, as seen in FIG. 3, spikes upward at 1B because of entry of combustion gases into the inlet 30 and entry of the compression wave 50.

Figure 4C:
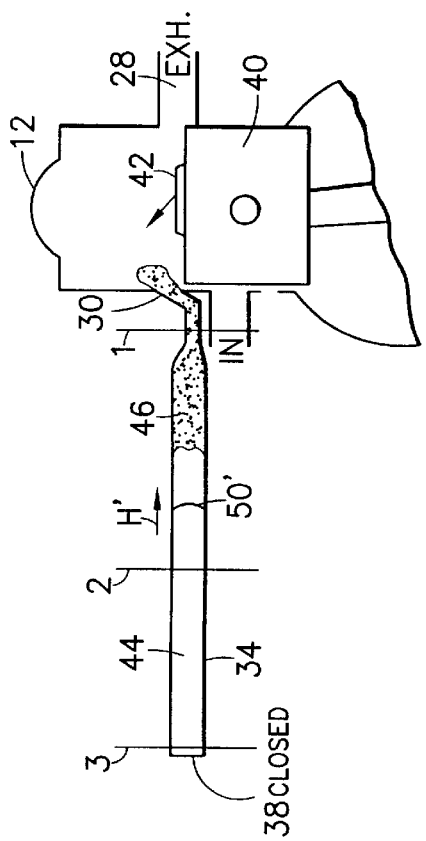

FIG. 4B corresponds to a short time later. The buffer 48 of combustion gases has further pushed into the inlet 30. The buffer 48 helps to heat the inlet 30 and helps to prevent fuel in the accumulator from directly short circuiting to the exhaust outlet 28. The compression wave 50 has moved further down the accumulator 34. FIG. 4C corresponds to a short time after the transfer 42 has opened at point TO. As seen in FIG. 3, the pressure F at the inlet 30 is now higher than the pressure G in the combustion chamber because of gases exiting the exhaust outlet 28. Therefore, the buffer 48 is pushed into the cylinder 12 (acting as a delay before entry of the air and fuel 46) and the air and fuel 46 start to enter the cylinder 12. The compression wave 50 has reflected off of the closed aperture $38_{close}$ and, more specifically, reflected off of the side of the piston head 40 covering the aperture 38. Thus, the compression wave 50 has become the reflected compression wave 50'. The reflected compression wave 50' is now traveling up the accumulator 34 back towards the inlet 30 as indicated by arrow H'. FIG. 4D corresponds to about the position 1C when the piston head is at bottom dead center (BDC). This generally corresponds to the BDC position shown in FIG. 1C. The reflected compression wave 50' arrives at the inlet 30 and exits into the cylinder 12. This causes a second spike in the pressure F at the inlet 30 as seen on FIG. 3. This second spike of pressure helps to propel fuel and air into the cylinder 12 at an accelerated rate. The compression wave is essentially an acoustic wave. Thus, the wave travels at the speed of sound. The timing of the delivery of the reflected compression wave back to the injection inlet 30 can be varied by varying the length of the accumulator conduit. A shorter accumulator conduit will deliver the reflected wave sooner and a longer accumulator conduit will deliver the reflected wave later. Thus, the length of the accumulator conduit 34 can be selected to deliver the reflected compression wave back to the injection inlet 30 at any suitable time. As shown in FIG. 3, there are three general groups of pressures of air and fuel $F_1$, $F_2$, $F_3$ exiting the inlet 30 into the cylinder and, thus, three corresponding rates of flow during these three pressure periods. Hence, a first volume from the inlet 30 will enter the cylinder 12 at a first rate, a subsequent second volume will enter the cylinder at a second higher rate, and a subsequent third volume will enter the cylinder at a third lower rate. However, in an alternate embodiment the accumulator can be configured to deliver the reflected compression wave closer to the period 1D when the inlet 30 is about to be closed. Thus, only two different rate periods need be provided. Alternatively, the accumulator could be configured to deliver more than one reflected compression wave back to the inlet 30, such as by providing the accumulator with multiple channels or multiple reflection surfaces. In effect, by closing the aperture 38 and using the closed aperture as a reflection area, the accumulator 34 functions as a tuned reflection pipe for the compression wave 50.

Referring also to FIGS. 5A–5C, charts of pressure on a reference scale at points 1, 2 and 3 in FIGS. 4A–4D are shown relative to time. Pressure at point 1 increases at time 4A corresponding to FIG. 4A when the compression wave enters the inlet 30. The pressure at point 1 trails off at times 4B and 4C corresponding to FIGS. 4B and 4C, respectively. The pressure at point 1 then sharply rises at time 4D corresponding to FIG. 4D when the reflected compression wave reaches point 1 and subsequently decreases after time 4D. FIG. 5B shows how pressure at point 2 rises just before time 4B as the compression wave 50 passes through point 2, goes down, then rises again just before time 4C as the reflected compression wave 50' passes, and then the pressure goes down again. FIG. 5C shows how point 3 merely has the one pressure spike from the compression wave's impact and reflection off of the closed aperture $38_{close}$.

As the reflected compression wave 50' exits the inlet 30 it causes the fuel and air in the cylinder 12 to be greatly disturbed; in effect functioning as a shock wave. This helps to atomize the fuel and distribute the fuel better in the air. In addition, the reflected compression wave assists in removing fuel droplets that might be adhering to tips or edges of the inlet 30 by surface adhesion or surface tension. The compression wave shocks the fuel off of the surface and into the cylinder 12. The compressed air 44 continues to push out the inlet 30 until the inlet is closed by the piston head again as shown in FIG. 1D. The residual air in the accumulator 34 after the inlet 30 is closed, just after 1D, is still pressurized. The inlet 30 completely closes shortly before the exhaust outlet 28 is closed at EC. The aperture 38 opens at substantially the same time the aperture 30 is closed. However, in alternate embodiments opening of the aperture 38 could be configured to occur before the aperture 30 is closed or, alternatively, after the aperture 30 is closed. The opening of the aperture 38 functions as a blow off port to relieve residual pressure from the compressed air in the accumulator 34 back into the crankcase 18 as shown by arrow I in FIG. 1D. Relieving pressure from the accumulator 34 when the inlet 30 is closed prevents an excessive amount of fuel from being pushed between the piston head 40 and the inside cylinder wall that could otherwise raise hydrocarbon emissions.

With the piston head 40 rising as shown by arrow J in FIG. 1D towards the TDC position, crankcase pressure E drops below 1 atmosphere as seen in FIG. 3. Thus, when aperture 38 is opened, not only is pressure in the accumulator 34 relieved, but a vacuum pressure is created in the accumulator 34. This vacuum pressure is used to pull fuel from the fuel metering device 20 and thus assist in delivering fuel into the accumulator. As seen in FIG. 3, the pressure F in the accumulator 34 now generally matches the pressure E in the crankcase 18 once again. Referring also to FIG. 1E the piston head 40 is shown at its TDC position. The air inlet 24 was opened at point IO. In this embodiment the inside wall of the cylinder 12 has a groove 60 between the inlet 30 and the inlet 24. This provides a path for a small amount of fuel (containing lubricant) to pass through the groove 60 as indicated by arrow K and lubricate bearings in the piston and crankshaft. However, the groove need not be provided. In an alternate embodiment a hole could be provided between the inlet 24 and the inlet 30 which would be spaced from the inside wall of the cylinder to deliver lubricant behind the piston head. The engine 10 could have an additional or alternative lubrication system.

Figure 6:
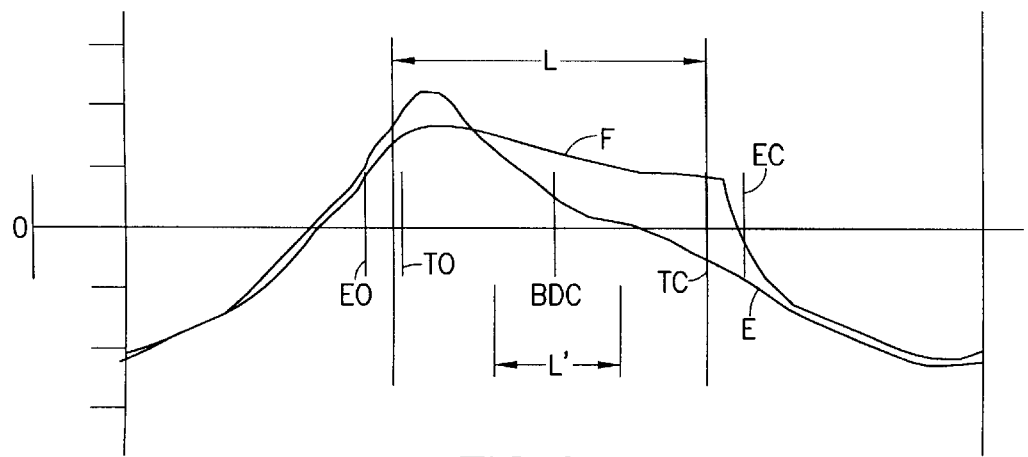
FIG. 6 is a graph as in FIG. 3 when a misfire occurs.

As is known in the art for small two stroke engines, misfires (i.e.: no combustion in the combustion chamber) can occur as much as one-third of the time. If a misfire occurs in the engine 10 a compression wave will not pass into the accumulator 34. Referring to FIG. 6 a graph of pressures E and F similar to FIG. 3 is shown when there is a misfire. L illustrates the injection period when the inlet 30 is open. The pressure F increases until the inlet 30 is opened and then it gradually decreases as the compressed air in the accumulator 34 exits the inlet 30 into the cylinder. After the inlet 30 is closed and the aperture 38 is opened, the pressure F returns to about the same pressure E as the crankcase 18. One of the features of the present invention is that the inlet aperture 30 can be sized to prevent the accumulator 34 from totally discharging into the cylinder 12. In other words, the accumulator 34 can be pressurized for the entire time that the inlet 30 is open such that compressed air is continually exerting pressure out the inlet 30 when the inlet 30 is open. This occurs regardless of whether there has been combustion or a misfire. Since the piston head 40 opens and closes all of the ports/channels 24, 28, 30, 38, 42, the engine 10 can be designed to provide different performance characteristics by changing the positions of the ports/channels 24, 28, 30, 38, 42 relative along the length of the cylinder and/or relative to each other along the length of the cylinder. This can change the timing of how long the accumulator is charged with compressed air from the crankcase, how long the accumulator blows off, how long the accumulator injects into the cylinder, etc. This can also change pressure rate changes, such as if the transfer channel, exhaust outlet or air inlet open sooner or later in the piston cycle.

Features of the above-described embodiment of the present invention have been tested on a 25 cc engine having a 75° angled injector aperture located 0.1 inch above the top of the transfer channel 42, a combined charge and blow off aperture located 0.05 inch below the bottom of the intake channel, an open air inlet, 1 psi fuel pressure with a single diaphragm fuel pump. For an average low speed of 2430 rpm, the engine produced the following:

| FUEL (g/hr) | CORRECTED POWER (KW) | HC FID (ppm) | HC (g/hr) |
|---|---|---|---|
| 64.466 | 0 | 28410.03 | 26.81 |

Where HC is hydrocarbon emission; and HC FID is total hydrocarbon emission in $C_1H_{1.85}$ equivalent as measured by a flame ionization detector. For an average high speed of 7487 rpm, the engine produced the following:

| FUEL (g/hr) | CORRECTED POWER (KW) | HC FID (ppm) | HC (g/hr) |
|---|---|---|---|
| 332.448 | 0.728 | 8438.31 | 26.97 |

This resulted in a total HC emission of 31.59 g/bhp*hr (grams/brake horse power*hour), total CO emissions of 77.25 g/bhp*hr (grams/brake horse power*hour), and total $NO_x$ emissions of 1.41 g/bhp*hr (grams/brake horse power*hour). For the average high speed (wide open throttle) average HC emission was 28.38 g/bhp*hr; average FC was 0.731 lb/hr; and average BSFC was 0.769 lb/bhp*hr, where FC is fuel consumption and BSFC is brake specific fuel consumption.

Another test of the same engine, but at a rich fuel setting was also conducted. For an average low speed of 3513 rpm, the engine produced the following:

| FUEL (g/hr) | CORRECTED POWER (KW) | HC FID (ppm) | HC (g/hr) |
|---|---|---|---|
| 79.534 | 0 | 37947.69 | 34.46 |

For an average high speed of 7496 rpm, the engine provided the following:

| FUEL (g/hr) | CORRECTED POWER (KW) | HC FID (ppm) | HC (g/hr) |
|---|---|---|---|
| 391.192 | 0.800 | 13146.97 | 42.05 |

This resulted in a total HC emission of 44.18 g/bhp*hr. In addition, total CO emission was 198.1 g/bhp*hr and total $NO_x$ emission was 1.098 g/bhp*hr. In a lean setting a total emission of 28.69 g/bhp*hr was obtained.

Additional test numbers were taken as follows:

| Engine Speed RPM | Fuel lb/hr | Observed hp | Intake deg. F. | SPGT deg. F. | CO % | CO2 % | O2 % | NOx ppm | HC ppm |
|---|---|---|---|---|---|---|---|---|---|
| 7460 | 0.609 | 0.74 | 88 | 441 | 0.44 | 8.48 | 9.00 | 99.9 | 8581.9 |
| 7478 | 0.668 | 0.85 | 90 | 457 | 1.02 | 9.30 | 7.51 | 133.9 | 8263.4 |
| 7494 | 0.699 | 0.89 | 93 | 469 | 1.54 | 9.42 | 6.91 | 140.8 | 8796.4 |
| 7495 | 0.722 | 0.90 | 93 | 475 | 1.94 | 9.40 | 6.60 | 144.5 | 10426.8 |
| 7503 | 0.753 | 0.93 | 95 | 477 | 2.53 | 9.15 | 6.43 | 136.9 | 11374.2 |
| 7511 | 0.795 | 0.98 | 100 | 475 | 3.16 | 8.91 | 6.28 | 132.1 | 12067.9 |
| 7512 | 0.817 | 0.98 | 108 | 475 | 3.61 | 8.69 | 6.17 | 118.7 | 13004.9 |

Figure 7:
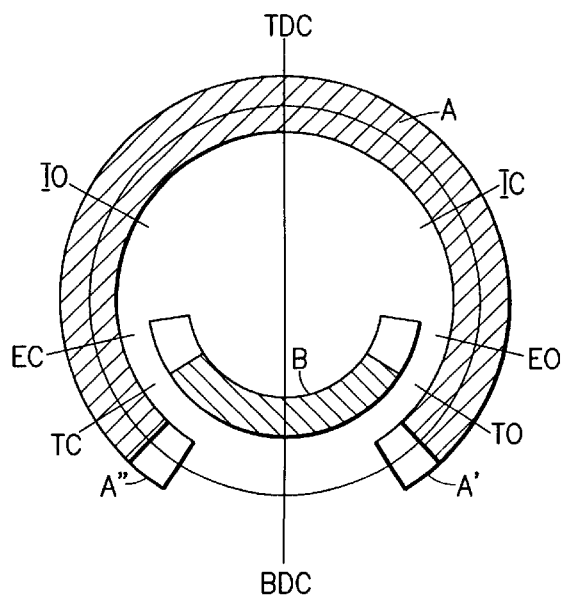
FIG. 7 is a diagram as in FIG. 2 of an alternate embodiment of the engine.

Referring now to FIG. 7, a graph similar to FIG. 2 is shown of when the two accumulator apertures are opened and closed for an alternate embodiment of the engine. In this embodiment of the engine the compressed air and fuel injection aperture is farther away from the top of the cylinder than shown in FIG. 1A. Thus, the compressed air and fuel injection aperture opens and closes at areas A' and A" closer to the BDC position of the piston head. The transfer channel is opened at TO before the injection port is opened at A' and the transfer channel is closed at TC after the injection port is closed at A". This provides an injection period L' as shown in FIG. 6. With the present invention both closures A and B can be selected merely based upon location of their respective apertures along the length of the cylinder. However, in alternate embodiments, alternative or additional means could be used to open and/or close the two accumulator ports.

Figure 8:
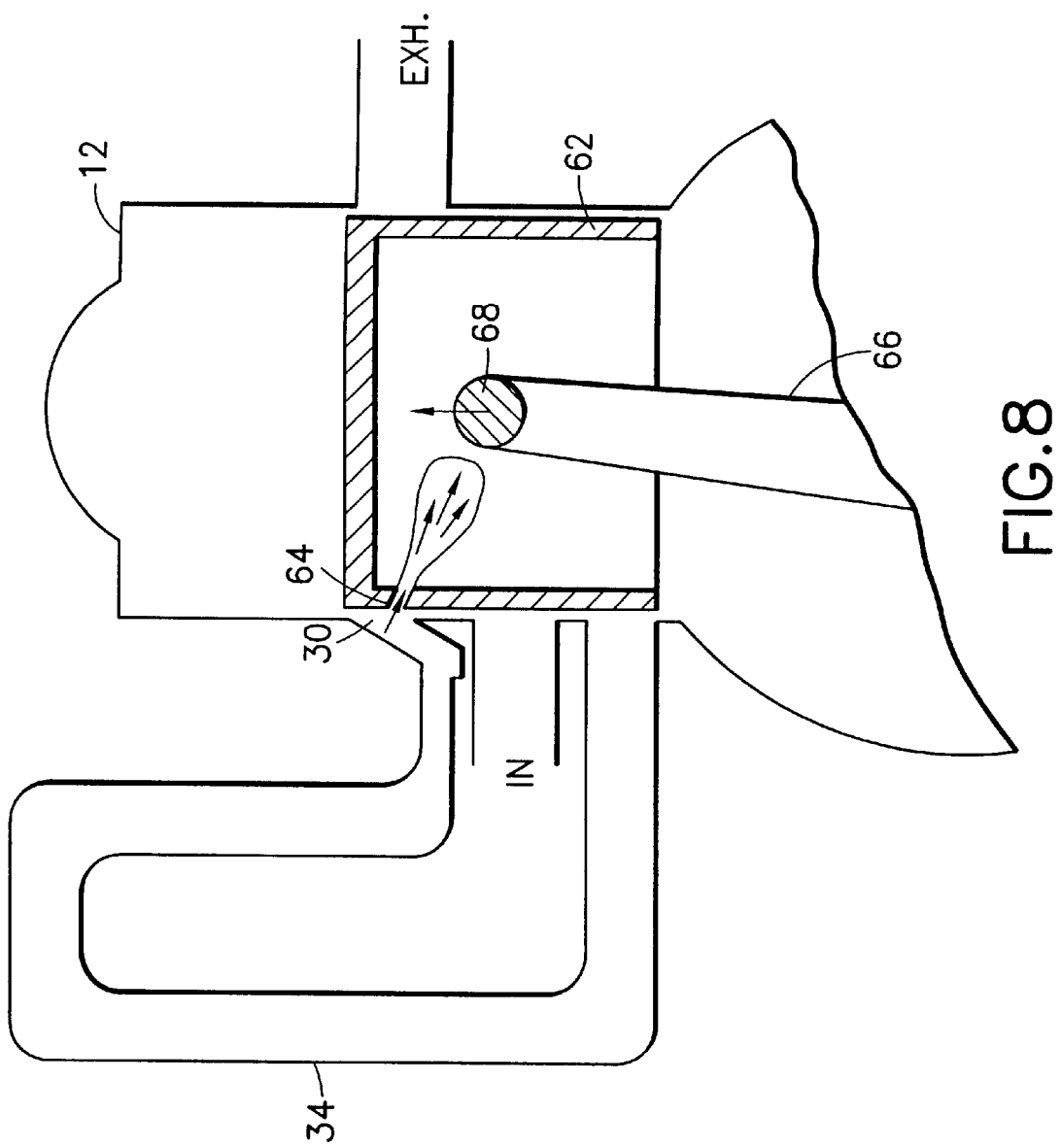
FIG. 8 is a partial schematic diagram similar to FIG. 1D of an alternate embodiment with a cross-sectional view of the piston head.

Referring now to FIG. 8, an alternative embodiment of a lubrication system for the engine is shown. In this embodiment the piston head 62 has a hole 64 through its side wall into its interior. The hole 64 is alignable with the inlet aperture 30 such that fuel (with its lubricant) can pass from the aperture 30, through the hole 64, and into the interior of the piston head 62. The piston head 62 is connected to a piston rod 66 by a bearing 68. The lubricant passing into the interior of the piston head 62 can also directly lubricate the bearing between the crankshaft and the piston rod 66. Although this type of lubrication system will increase hydrocarbon emissions, the increase is very small and, therefore, still allows the engine to pass upcoming new governmental hydrocarbon emission standards.

Figure 9:
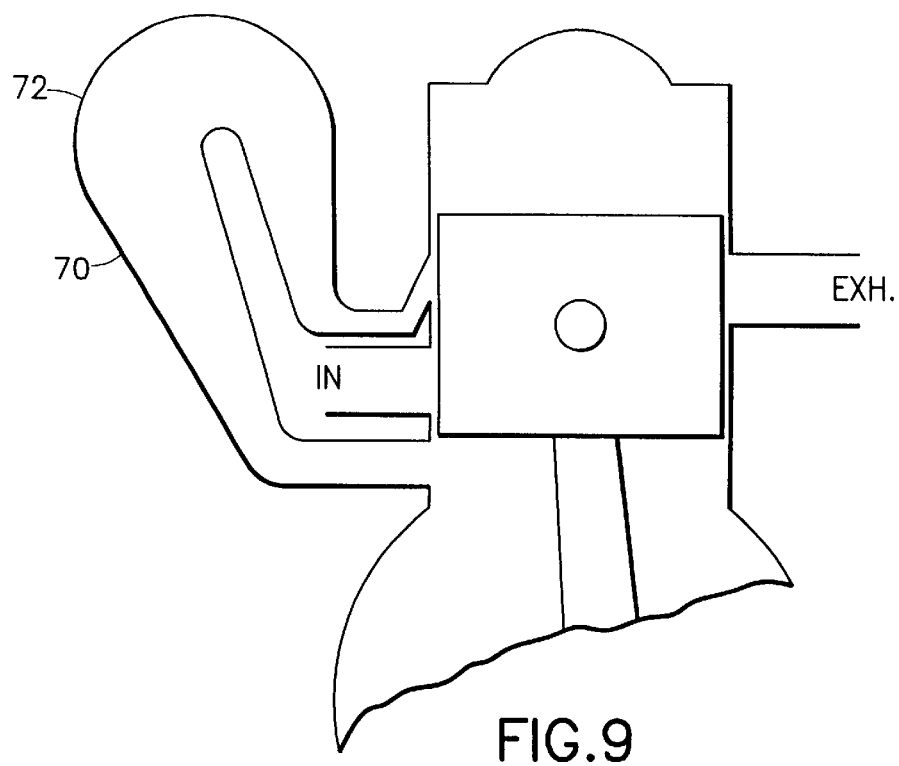
FIG. 9 is a partial schematic diagram of an engine with an alternate embodiment of the accumulator.

Referring now to FIG. 9 the engine is shown with an alternate embodiment of the accumulator conduit 70. As noted above, the accumulator functions as both a compressed air accumulator and as a tuned reflection pipe. In this embodiment the accumulator conduit 70 has an expansion chamber section 72 which is adapted to enlarge the length of the reflected compression wave relative to the length of the initial compression wave. Thus, the reflected compression wave is spread out over a longer period of time for a second pressure spike which is longer in time than $F_2$ shown in FIG. 3. The accumulator conduit can be configured to provide any suitable tuned pipe enhancement of the original compression wave.

Figure 10:
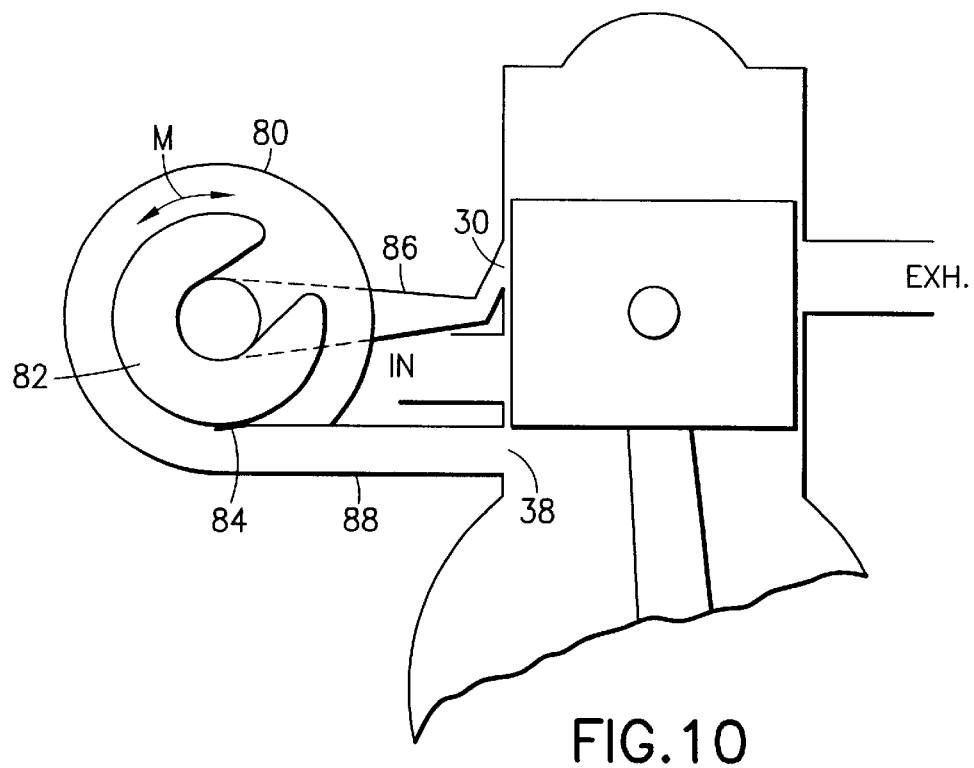
FIG. 10 is a partial schematic diagram of an engine with another alternate embodiment of the accumulator.

Referring now to FIG. 10 the engine is shown with another alternate embodiment of the accumulator 80. In this embodiment the accumulator 80 provides a continually variable length tuned pipe which is continually variable based upon the speed of the engine. The accumulator 80 has a rotatable inner pipe member 82, a sliding seal 84, a first pipe section 86 between the injection aperture 30 and the inner pipe member 82, and a second pipe section 88 between the aperture 38 an the inner pipe member 82. The inner pipe member 82 is rotatable as indicated by arrow M to vary the effective pipe length between the two apertures 30, 38. Any suitable means could be provided to rotate the inner pipe member 82 based upon the speed of the engine, such as a mechanical connection to a throttle or an electronic control device. In another alternate embodiment a sliding trombone type of variable length accumulator conduit could be provided.

The system as described above provides numerous new features. The small size of the injection aperture 30 allows for a sustained injection regardless of whether combustion occurred immediately before the injection cycle. The accumulator is a closed end system during the injection cycle for reflection purposes. The transfer channel can be opened before introduction of the fuel into the combustion chamber. Pressure in the accumulator is relieved or blown off in every cycle of the piston thereby reducing fuel leakage between the piston head and the cylinder wall from the injection port. Vacuum drawing of fuel into the accumulator proximate the injection inlet 30 can be used to simplify the type of fuel pump used, such as use of a simple diaphragm fuel pump. The length and shape of the accumulator conduit system can take advantage of the compression wave to deliver a reflected compression wave for enhanced fuel and compressed air delivery through the injection inlet 30. The reflected compression wave can atomize fuel in the inlet 30, push the injection through the inlet 30 faster, and also atomize fuel against substantially static air all ready in the combustion chamber. Thus, there is provided an accelerated late delivery of a portion of the fuel charge which is inherent to the present system. This late delivery reduces the amount and likelihood of unburned fuel short circuiting directly to the exhaust 28. Thus, hydrocarbon emissions are reduced. The reflected compression wave can be delivered to the injection aperture at the end of scavenging after BDC. The accumulator conduit has two variably open and closed ends to provide a closed end tuned pipe function as well as a compressed air accumulator function and an accumulator blow off pressure relieve function. Because of the opening and closing natures of the apertures 30, 38, no direct open path is provided between the cylinder and the crankcase by the accumulator. The tuned pipe feature of the accumulator conduit can be tuned, such as with an expansion chamber, to spread out the reflected compression wave to compensate for varying speeds of the engine. Fuel trapping is enhanced to about 80%–95%. Thus, fuel trapping losses can be as low as only 5%. In old style systems fuel trapping was only about 60%–70%. The present system has better fuel efficiency because of reduced combustion loss and reduces occurrences of misfires because of better fuel mixing from the reflected compression wave. The present invention can also be used as a self governing effect to prevent overspeed of an engine, such as in a chain saw, because the tuned pipe feature of the accumulator conduit can go out of tune at overly high speeds, thus losing the appropriate timed delivery of the fuel ramming feature of the reflected compression wave.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. In an internal combustion engine having a crankcase, a cylinder connected to the crankcase, a compressed air assisted fuel injection system connected between the crankcase and the cylinder, and a reciprocating piston head located in the cylinder, wherein the improvement comprises:

the compressed air assisted fuel injection system having a conduit system with a first aperture into the cylinder forming a fuel and compressed air injection port and a second aperture which, based upon position of the piston in the cylinder, is connectable to pressure inside the crankcase, the second aperture forming a compressed air entrance and blow off port, wherein the piston head opens and closes the two ports as the piston head reciprocates in the cylinder, wherein the first and second apertures are spaced relative to each other and the piston head is sized and shaped such that the piston head substantially simultaneously opens the compressed air entrance and blow off port and closes the fuel and compressed air injection port, and wherein the blow off port remains open as the piston head moves to and through a top dead center position.

2. An engine as in claim 1 wherein the injection port is sized to restrict flow of air through the injection port such that an entire amount of air exiting the injection port in a single injection cycle is pressurized and compressed air is left in the conduit system after the injection port is closed.

3. An engine as in claim 1 further comprising a hole in the piston head which is alignable with the injection port to allow a lubricant in the fuel to pass from the injection port and into the hole to lubricate a bearing connecting the piston head to a piston rod.

4. An engine as in claim 1 wherein the cylinder includes a lubrication channel along an inside wall from the injection port to a location past a rear end of the piston head when the piston head is at the top dead center position.

5. An engine as in claim 4 wherein the lubrication channel opens into an air inlet.

6. An engine as in claim 1 wherein access between the cylinder and the conduit system is closed and access between the crankcase and conduit system is open during vacuum pressure in the crankcase such that fuel is vacuum pulled into the conduit system during a forward stroke of the piston head toward the top dead center position and air is compressed into the conduit system during a rearward stroke of the piston head.

7. An engine as in claim 1 wherein the conduit system forms a tuned reflection pipe for the injection port, the conduit system having a tuned pipe length to deliver a reflection of a combustion generated compression wave back to the injection port during a later half of delivery of fuel from the injection port into the cylinder.

8. In an internal combustion engine having a compressed air assisted fuel injection system connected between a source of compressed air and a cylinder of the engine, wherein the improvement comprises:

the compressed air assisted fuel injection system having a compressed air accumulator and means for relieving compressed air pressure in the accumulator during a majority of when a fuel and compressed air injection port of the injection system is closed by a piston head of the engine and the piston head is moving towards a top dead center position.

9. An engine as in claim 8 wherein the means for relieving comprises a combined compressed air entrance and blow off port between the accumulator and a crankcase of the engine.

10. An engine as in claim 9 wherein the combined compressed air entrance and blow off port is provided at a bottom of the cylinder.

11. An engine as in claim 10 wherein the piston head opens and closes the combined compressed air entrance and blow off port.

12. An engine as in claim 11 wherein the two ports are reciprocatingly opened and closed by the piston head.

13. An engine as in claim 8 wherein the injection port is sized to restrict flow of air from the accumulator through the injection port such that an entire amount of air exiting the injection port is pressurized and compressed air is left in the conduit system after the injection port is closed.

14. An engine as in claim 8 further comprising a hole in the piston head which is alignable with the injection port to allow a lubricant in fuel to pass from the injection port and into the hole to lubricate a bearing connecting the piston head to a piston rod.

15. An engine as in claim 8 wherein the cylinder includes a lubrication channel along an inside wall from the injection port to a location past a rear end of the piston head when the piston head is at the top dead center position.

16. An engine as in claim 15 wherein the lubrication channel opens into an air inlet.

17. An engine as in claim 8 wherein access between the cylinder and the accumulator is closed and access between the crankcase and the accumulator is open during vacuum pressure in the crankcase, and a fuel metering device has an exit connected to the accumulator such that fuel is vacuum pulled into the accumulator during movement of the piston head towards the top dead center position and air is compressed into the accumulator during a movement of the piston head away from the top dead center position.

18. An engine as in claim 8 wherein the accumulator forms a tuned reflection pipe for the injection port with a tuned pipe length to deliver a reflection of a combustion generated compression wave back to the injection port during a later half of delivery of fuel and air through the injection port into the cylinder.

19. In an internal combustion engine having a compressed air assisted fuel injection system connected between a source of compressed air and a cylinder of the engine, wherein the improvement comprises:

the compressed air assisted fuel injection system including an accumulator for providing a charge of compressed air and an aperture from the accumulator into the cylinder, wherein the aperture is sized to restrict flow of the charge into the cylinder such that the entire charge during an injection period as the charge leaves the aperture is pressurized, and a second aperture from the accumulator into the cylinder which is opened behind a piston head of the engine as the piston head moves towards a top dead center position.

20. An engine as in claim 19 wherein the means to relieve comprises a second aperture from the accumulator into the cylinder which is opened behind a piston head of the engine as the piston head moves towards a top dead center position.

21. An engine as in claim 19 further comprising a hole in a piston head which is alignable with the injection port to allow a lubricant in fuel to pass from the injection port and into the hole to lubricate a bearing connecting the piston head to a piston rod.

22. An engine as in claim 19 wherein the cylinder includes a lubrication channel along an inside wall from the injection port to a location past a rear end of the piston head when the piston head is at a top dead center position.

23. An engine as in claim 22 wherein the lubrication channel opens into an air inlet into the crankcase.

24. An engine as in claim 19 wherein the accumulator forms a tuned reflection pipe for the injection port with a tuned pipe length to deliver a reflection of a combustion generated compression wave back to the injection port during a later half of delivery of fuel and air from the injection port into the cylinder.

25. In an internal combustion engine having a compressed air assisted fuel injection system connected between a source of compressed air and a cylinder of the engine, wherein the improvement comprises:

the compressed air assisted fuel injection system having a conduit between the source of compressed air and the cylinder, the conduit having a first aperture into the cylinder and a second aperture, and the engine has a system for opening and closing the first and second apertures, wherein the second aperture is closed while the first aperture is open, and wherein, as a piston in the cylinder moves towards a top dead center position, the second aperture is open during a majority of when the first aperture is closed.

26. An engine as in claim 25 wherein both the first and second apertures extend into the cylinder and the piston head reciprocally opens and closes the apertures.

27. An engine as in claim 25 wherein the second aperture is connected to pressure in a crankcase of the engine when the second aperture is open.

28. An engine as in claim 25 wherein the conduit has a length and the second aperture is closed to form a tuned reflection pipe for the first aperture to receive a compression wave from combustion in the cylinder and reflect the compression wave back to the first aperture during a later half of the first aperture being open.

29. An engine as in claim 27 wherein the conduit includes an expansion chamber section to lengthen the reflected compression wave.

30. An engine as in claim 25 wherein the first aperture is sized to restrict flow of air through the injection port such that compressed air is left in the conduit after the first aperture is closed.

31. An engine as in claim 30 wherein the second aperture is connectable to pressure in a crankcase of the engine such that pressure from the compressed air in the conduit after the first aperture is closed is relieved into the crankcase.

32. In an internal combustion engine having a compressed air assisted fuel injection system connected between a crankcase and a cylinder of the engine, wherein the improvement comprises:

the compressed air assisted fuel injection system having a conduit between the crankcase and the cylinder, a fuel metering device with a fuel exit into the conduit, and wherein a piston head of the engine opens and closes access to the conduit from the cylinder and the crankcase, wherein access between the cylinder and the conduit is closed and access between the crankcase and conduit is open during vacuum pressure in the crankcase such that fuel is vacuum pulled into the conduit during a forward stroke of the piston head and air is compressed into the conduit during a rearward stroke of the piston head.

33. A method of injecting air and fuel into a cylinder of an internal combustion engine comprising steps of:

compressing air into an accumulator;

opening an injection port into the cylinder and injecting the compressed air from the accumulator and fuel from the injection port into the cylinder;

closing the injection port; and opening a blow off port of the accumulator to relieve residual compressed air pressure from the accumulator.

34. A method as in claim 33 wherein the step of compressing air comprises opening the blow off port and allowing compressed air to enter the accumulator through the blow off port.

35. A method as in claim 33 wherein the steps of opening and closing comprise moving a piston head of the engine over and away from the ports.

36. A method as in claim 33 further comprising passing lubricant from the injection port into a hole in a piston head of the engine to lubricate a bearing between the piston head and a piston rod.

37. A method as in claim 33 further comprising passing lubricant from the injection port along a channel on an inside surface of the cylinder to a location past a rear end of a piston head of the engine.

38. A method as in claim 33 further comprising closing the blow off port when the injection port is opened to form the accumulator into a closed end tuned reflection pipe.

39. In an internal combustion engine having a compressed air assisted fuel injection system connected between a source of compressed air and a cylinder of the engine, wherein the improvement comprises:

the compressed air assisted fuel injection system having a compressed air accumulator and a relief system for relieving compressed air pressure in the accumulator during a majority of when a fuel and compressed air injection port of the injection system is closed by a piston head of the engine and the piston head is moving towards a top dead center position, wherein the relief system comprises a combined compressed air entrance and blow off port between the accumulator and a crankcase of the engine, and wherein the combined compressed air entrance and blow off port is provided at a bottom of the cylinder.

40. In an internal combustion engine having a compressed air assisted fuel injection system connected between a source of compressed air and a cylinder of the engine, wherein the improvement comprises:

the compressed air assisted fuel injection system having a conduit between a first aperture into the cylinder and a second aperture relatively lower of the cylinder, and the engine has a piston which directly opens and closes the first and second apertures, wherein the second aperture is closed by the piston during a majority of when the first aperture is open, and wherein the second aperture is open during a majority of when the first aperture is closed by the piston.

41. In an internal combustion engine having a crankcase, a cylinder connected to the crankcase, a compressed air assisted fuel injection system connected between the crankcase and the cylinder, and a reciprocating piston head located in the cylinder, wherein the improvement comprises:

the compressed air assisted fuel injection system having a conduit system with a first aperture into the cylinder forming a fuel and compressed air injection port and a second aperture communicating with the crankcase and forming a compressed air entrance, wherein the piston head opens and closes the two ports as the piston head reciprocates in the cylinder, and wherein the cylinder includes a lubrication channel along an inside wall from the injection port to at least partially define a path to a location past a rear end of the piston head when the piston head is at a top dead center position.

42. In an internal combustion engine having a compressed air assisted fuel injection system connected between a source of compressed air and a cylinder of the engine, wherein the improvement comprises:

the compressed air assisted fuel injection system including an accumulator for providing a charge of compressed air and an aperture from the accumulator into the cylinder, wherein the aperture is sized to restrict flow of the charge into the cylinder such that the entire charge during an injection period as the charge leaves the aperture into a combustion chamber of the cylinder is pressurized, and wherein the cylinder includes a lubrication channel along an inside wall from the injection port to at least partially form a lubricant delivery path from the injection port to a location behind a rear end of the piston head when the piston head is at a top dead center position.

43. A method of injecting air and fuel into a cylinder of an internal combustion engine comprising steps of:

opening an injection port into the cylinder and injecting the air and fuel from the injection port into the cylinder;

closing the injection port; and passing lubricant from the injection port along a channel on an inside surface of the cylinder to a location behind a rear end of a piston head of the engine.

44. A method as in claim 43 further comprising compressing the air into an accumulator and injecting the compressed air with the fuel from the injection port.

45. A method as in claim 44 further comprising opening a blow off port of the accumulator to relieve residual compressed air pressure from the accumulator.

46. A method of lubricating a two stroke engine comprising steps of:

transporting a first fuel and oil mixture quantity with air into a combustion chamber of a cylinder of the engine; and transporting a second fuel and oil mixture quantity with air into a crankcase of the engine;

wherein the first mixture quantity is transported into the combustion chamber without passing through the crankcase, and wherein the second mixture quantity is not a sufficient quantity for operation of the engine without the first mixture quantity being transported into the combustion chamber.

47. A method as in claim 46 wherein the first and second fuel and oil mixtures are provided as being substantially identical.

48. A method as in claim 47 wherein the first and second fuel and oil mixture quantities are supplied from a common premixed supply.

49. A two stroke engine comprising:

a crankcase;

a cylinder connected to the crankcase;

a piston located in the cylinder; and a dual intake system for supplying air, fuel and lubricant, wherein a first intake of the dual intake system supplies a first quantity of a fuel and lubricant mixture for injection with air directly into a combustion chamber in the cylinder, and wherein a second intake of the dual intake system supplies air and a second quantity of the fuel and lubricant mixture to the crankcase, wherein the second quantity is substantially smaller than the first quantity.

50. A two stroke engine comprising:

a crankcase;

a cylinder connected to the crankcase;

a piston located in the cylinder; and a system for supplying air, fuel and lubricant, the system comprising:

a first intake for supplying a rich air, fuel and lubricant mixture for injection directly into a combustion chamber of the cylinder, a second intake for supplying air to the crankcase, and a path between the first intake and the crankcase for transporting a portion of the rich mixture from the first intake for introduction into the crankcase for providing lubrication in the crankcase.

51. An engine as in claim 50 wherein the path extends from the first intake into the second intake and then into the crankcase.

52. An engine as in claim 50 wherein the path is located to be selectively opened and closed by the piston.

53. An engine as in claim 50 wherein the path includes a slot along an interior side of the cylinder.

54. A method for providing air, fuel and lubricant in a two stroke engine comprising steps of:

providing a rich air, fuel and lubricant mixture through a first intake for injection directly into a combustion chamber of a cylinder of the engine;

providing air through a second intake into a crankcase of the engine;

diverting a relatively small portion of the rich mixture passing through the first intake from the first intake into the crankcase for providing lubrication in the crankcase.

55. A method as in claim 54 wherein the step of diverting comprises passing the portion along a slot in an inner surface of the cylinder.

56. A method as in claim 55 wherein the step of diverting comprises passing the portion from the slot into the second intake.

57. An engine as in claim 32 wherein access to the conduit from the cylinder comprises an injection port located above a top surface of the piston head when the piston head is in a bottom dead center position.

* * * * *